(No Model.)  2 Sheets—Sheet 1.
W. M. WARD.
ROAD CART.
No. 439,218. Patented Oct. 28, 1890.
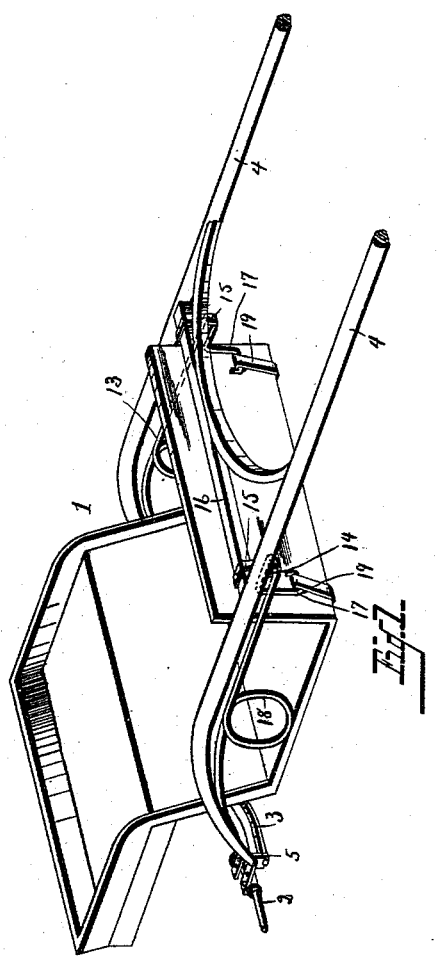
WITNESSES
Carroll J. Webster.
R. W. Elliott
INVENTOR
William M. Ward
By Myers & Webster
Attys (No Model.) 2 Sheets—Sheet 2.
W. M. WARD.
ROAD CART.
No. 439,218. Patented Oct. 28, 1890.
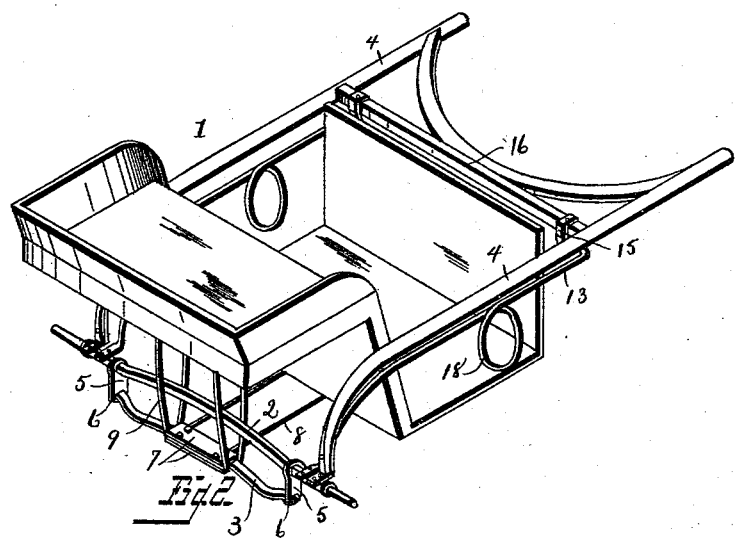
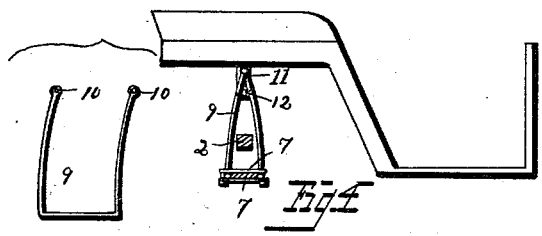
WITNESSES
Carroll J. Webster
R. W. Elliott
INVENTOR
William M. Ward
By Myers & Webster
Attys
THE NORRIS PETERS CO., PHOTO-LITHO., WASHINGTON, D. C.

UNITED STATES PATENT OFFICE.

WILLIAM M. WARD, OF GRAND BLANC, ASSIGNOR TO JAMES D. HUBBELL, OF CLYDE, MICHIGAN.

ROAD-CART.

SPECIFICATION forming part of Letters Patent No. 439,218, dated October 28, 1890.

Application filed April 11, 1890. Serial No. 347,564. (No model.)

*To all whom it may concern:*

Be it known that I, WILLIAM M. WARD, a citizen of the United States, residing at Grand Blanc, in the county of Genesee and State of Michigan, have invented certain new and useful Improvements in a Road-Cart; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to an improvement in road-carts.

The object of the invention is to produce a road-cart which shall be so constructed and arranged that all horse motion will be overcome, which feature is most objectionable in vehicles of this class. A further object is to produce a simple, efficient, and durable road-cart.

With these objects in view the invention consists, broadly, in the combination, with the axle of the vehicle, of a spring having a swinging connection therewith, the body pivoted on the said spring, and resilient body-supports connecting with the said axle and adapted to sustain the front portion of the body.

The invention further consists in the combination of the axle, the body-spring carried thereby, the body supported on said spring, the thills, side springs connecting with the axle and confined in clips of the said thills, and means for connecting the side springs and body.

The invention finally consists in the various novel details of construction, as will be hereinafter fully described in the specification, illustrated in the drawings, and more particularly pointed out in the claims.

In the accompanying drawings, forming part of this specification, and in which like numerals of reference indicate corresponding parts, I have illustrated one form of road-cart embodying the essential features of my invention, although the same may be carried into effect in other ways without in the least departing from the spirit thereof, and in these drawings—

Figure 1 is a perspective view of my improved road-cart, the wheels being removed. Fig. 2 is a perspective view showing more particularly the axle and body-spring. Fig. 3 is a detail view of one of the hangers for connecting the body-spring and axle; and Fig. 4 is a side elevation, partly in section, of the body, showing one of the standards for supporting the body on the body-spring.

Referring to the drawings, 1 designates the body of the vehicle, which may be of any approved construction; 2, the axle; 3, the body-springs, and 4 the thills. All of these parts may be made of any desired material and ornamented in any manner to produce a neatly-finished effect. At a point on the axle adjacent to the thills are loosely mounted two hangers 5, the lower ends of which are provided with openings 6, through which extend the ends of the body-spring. To the body-spring are secured two plates 7, between which are clamped two brace-rods 8, the ends of the same being secured to the body to protect the said spring against undue strain when the vehicle is driven over rough and uneven roads. Between the plates 7 are also secured two standards 9, the bases of which rest between the said plates, while the upper ends are formed into eyes 10, through which extend bolts for securing the standards to downward-extending projections 11 (one only being shown) on the body of the cart. These projections are provided with a series of openings 12, so as to admit of the body being adjusted vertically to any desired height.

The side springs 13, to which reference has been made in the first part of this specification, are constructed, preferably, of spring-steel, and are secured at one end to the axle, while the metal at a point near the opposite ends is formed into partial loops 14, adapted to work between clips 15 on the cross-bar 16 of the thills, and at the ends into loops 17, adapted to be engaged by metallic straps 19 on the body of the vehicle, which straps form a flexible connection between the body and side springs. At a point preferably intermediate the ends the springs are formed into coils 18, which construction not only adds to their resiliency but also to their lifting power, so that considerable strain is taken from the body-spring when the wheels strike any obstacle in the road, thus adding to the comfort of the occupant of the cart and at the same time lessening the danger of breakage of either of the springs. The side springs may be made of flat metal; but as it is desirous to obtain a lateral as well as a vertical motion of the vehicle-body, they are constructed of steel that is round in cross-section. Thus when the cart is thrown violently to one side the loops will open and thus allow the body to swing laterally until level or smooth ground is reached, when the said loops will resume their normal or closed position and draw the cart-body to its normal position. By connecting the body-spring to the axle by means of the hangers 5 this lateral motion is increased, but at the same time the strain incident thereto is borne directly by the axle instead of by the body-spring, which would be the case were the body-spring connected with the axle, as in vehicles of ordinary construction.

From the foregoing description the advantages of my improved road-cart will be apparent. It will be seen that the horse motion from the shafts, instead of being transmitted to the body of the cart, is taken up by the side springs, by which it is conveyed to the body-spring, where it is changed from a rocking to a vertical movement, or that which is common to four-wheeled vehicles.

Having thus fully described my invention, what I claim as new, and desire to secure by Letters Patent, is—

1. In a road-cart, the combination of the axle, the body supported thereon, side springs connecting at their rear ends with the axle and extending to the front of the body, and flexible connections connecting the front ends of the said springs with the body.

2. In a road-cart, the combination of the axle, the body-spring carried thereby, the body supported thereon, side springs connecting at their rear ends with the axle and extending to the front of the body, and flexible connections connecting the front ends of the said springs with the body.

3. In a road-cart, the combination of the axle, the body-spring carried thereby, the body supported by the said spring, the thills, the side springs connecting at their rear ends with the axle, clips on the said thills, between which the side springs are confined, and straps connecting the front ends of the said side springs with the body.

4. In a road-cart, the combination of the axle, the body-spring having a swinging connection therewith, the body pivoted on said spring, side springs connecting with the said axle, and straps connecting the said side springs and body, as and for the purpose set forth.

5. In a road-cart, the combination of the axle, hangers loosely mounted thereon, the body-spring engaging the said hangers, the body supported on the body-spring, and side springs connecting with the axle and adapted to support the front of the said body, as and for the purpose set forth.

6. In a road-cart, the combination of the axle, hangers loosely mounted thereon, the body carried by said hangers, standards secured to the body-spring and having an adjustable connection with the said body, brace-rods connecting the body-spring and body, and side springs connecting with the axle and the body, the said springs having coils to increase their resiliency, as and for the purpose set forth.

In testimony that I claim the foregoing as my own I hereby affix my signature in presence of two witnesses.

WM. M. WARD.

Witnesses:
FREDERICK HARRIS,
LILLIE E. HARRIS.